United States Patent [19]

McMurtry

[11] Patent Number: 4,879,817
[45] Date of Patent: Nov. 14, 1989

[54] CHECKING THE SETTING OF A TOOL

[75] Inventor: David R. McMurtry, Wotton-under-Edge, United Kingdom

[73] Assignee: Renishaw plc, England

[21] Appl. No.: 116,142

[22] Filed: Nov. 3, 1987

[30] Foreign Application Priority Data

Nov. 15, 1986 [GB] United Kingdom ................. 8627374

[51] Int. Cl.⁴ ............................................. G01B 21/04
[52] U.S. Cl. ........................................ 33/502; 33/645; 33/626
[58] Field of Search ................. 33/613, 626, 638, 640, 33/641, 644, 645, 502, 567, 632, 169 C, 168 R, 1 M

[56] References Cited

U.S. PATENT DOCUMENTS

| 4,153,998 | 5/1979 | McMurtry . |
| 4,288,925 | 9/1981 | McMurtry . |
| 4,320,580 | 3/1982 | Williams ........................ 33/501 X |
| 4,382,215 | 5/1983 | Barlow et al. . |

FOREIGN PATENT DOCUMENTS 3024560 1/1982 Fed. Rep. of Germany ........ 33/503
3538551 10/1986 Fed. Rep. of Germany ........ 33/567

OTHER PUBLICATIONS

"Renishaw 3 Dimensional Probes for In-Cycle Gauging Applications On Machining Centres and Lathes".
"Users Handbook Programs for Probes Component Inspection and Tool Datuming with Fanuc 6TB Control", Renishaw.

Primary Examiner—Harry N. Haroian
Attorney, Agent, or Firm—Oliff & Berridge

[57] ABSTRACT

For setting the cutting tip (30) of a cutting tool (32) of a lathe, a tool-setting probe (10) has a stylus tip (18) for contacting the tool tip (30). The stylus tip (18) is generally cube-shaped. In addition to a conventional vertical datum surface (36) for setting the tool in the horizontal direction (arrow A), it has a 45° sloping datum surface (38). The tool is touched in the direction of arrow A against both surfaces (36,38). The horizontal difference between the two contact positions is a measure of the height of the tool tip (30), enabling it to be set in the vertical direction.

16 Claims, 3 Drawing Sheets

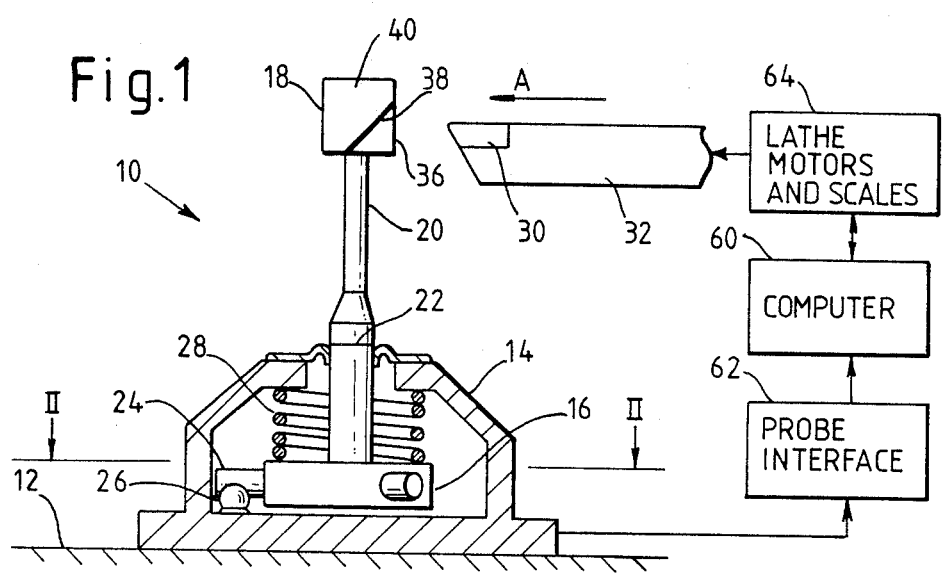
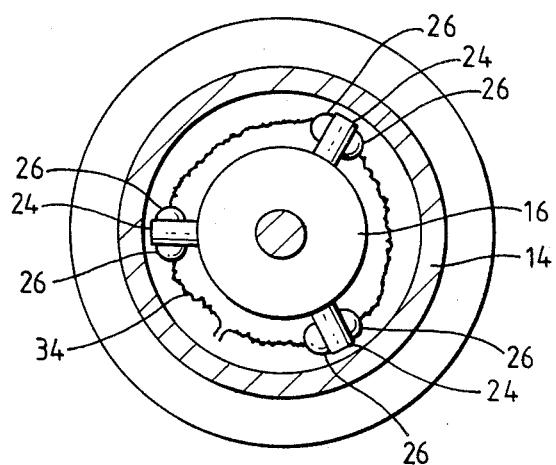
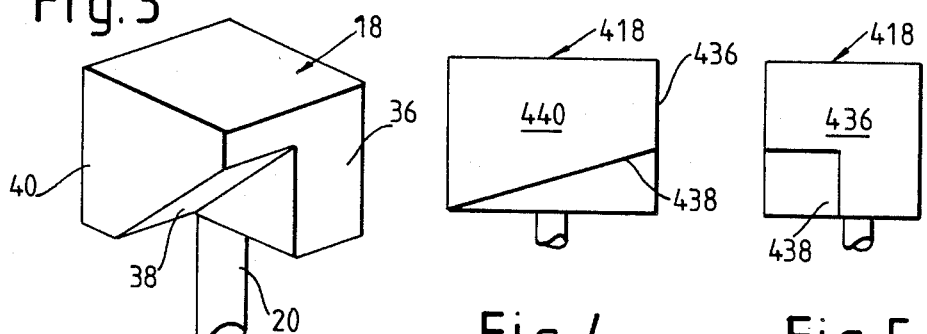

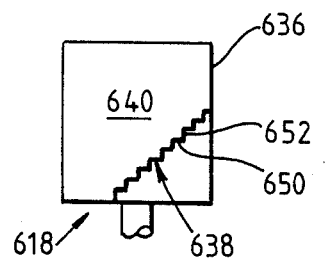
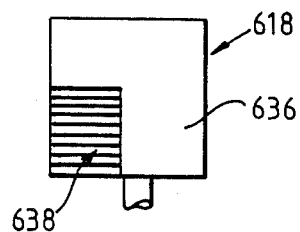
Fig. 6  Fig. 7
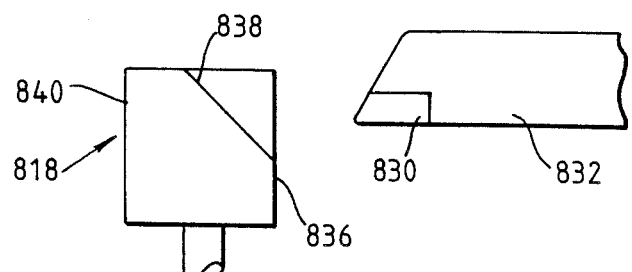
Fig. 8
Fig. 9  Fig. 11
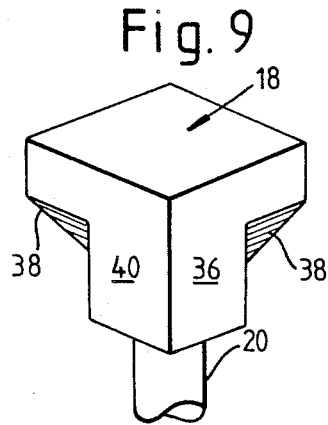
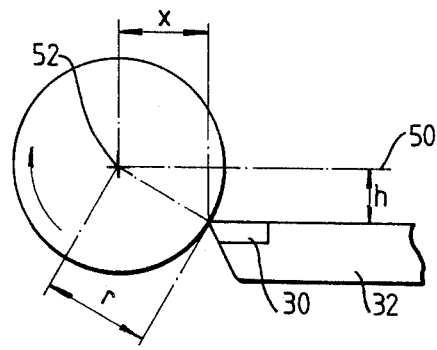

CHECKING THE SETTING OF A TOOL

FIELD OF THE INVENTION

This invention relates to setting or datuming tools on a machine tool such as a lathe.

DESCRIPTION OF PRIOR ART

The setting of a cutting tool on a lathe was traditionally a manual operation in which the position of the tool in a tool holder was measured and adjusted so that its cutting tip was in a defined position. In the case of the height of the tip above the lathe bed, this was done by packing shim between the tool and the tool holder until the tip height coincided with the centre line of the lathe (the axis of rotation of its workpiece-holding chuck). The direction of this height adjustment may be referred to as the Y direction of the machine, on the convention that the axis of rotation of the workpiece-holding chuck defines the Z axis, and the tool holder is mounted for sliding movement in at least the X and Z directions.

On a modern computer numerically controlled lathe, it is known to provide a tool setting probe in a defined position relative to the lathe bed. The probe has a stylus whose tip is cube-shaped to provide datum surfaces in one or more of the X and Z directions, at least. The stylus tip ca be deflected from a rest position when one of its datum surfaces is contacted by the tool tip. The probe has a touch trigger mechanism (e.g. as described in U.S. Pat. No. 4,153,998) which provides an output signal at the instant of such contact, to cause the lathe's controlling computer to take a reading of the tool position from a measurement scale of the lathe. The difference between the measurement and the known position of the datum surface is used by the computer as an offset value for the tool tip during subsequent machining operations. Such tool setting probes can be seen in a brochure "3 Dimensional Probes for In-Cycle Gauging Applications on Machining Centres and Lathes", published by Renishaw Metrology Limited. Methods of datuming or checking tool setting using such probes are described in U.S. Pat. No. 4,382,215 and in "User's Handbook-Programs, Component Inspection and Tool Datuming with Fanuc 6TB Control", Part 5, pp 44–56, published by Renishaw.

Such a tool setting probe facilitates tool datuming in the X and Z directions. However, it cannot be used to datum the tool in the Y direction (i.e. to check its height setting) unless the lathe is a three axis machine (one in which the tool holder is movable in the Y direction as well as the normal X and Z directions). Such three axis lathes are as yet relatively uncommon. Accordingly, current practice is simply to rely on the accuracy of the height of the mounting of the tool in the tool holder, but this is not always reliable and in any case cannot give an indication of problems such as a chipped or worn tool tip. For accurate machining, the height of the tool tip should coincide with the axis of rotation of the chuck; and of course facing tools and parting off tools rely on such coincidence.

SUMMARY OF THE INVENTION

One of the objects of the invention, at least in a preferred embodiment, is to provide means for checking the setting of a tool in the Y or height direction on a two axis lathe (i.e. where the tool holder is movable in X and Z directions). However, some embodiments of the invention, at least, may also be used as an alternative for tool datuming or checking tool setting on three axis lathes and on other machine tools such as machining centres, and in such applications, at least, it can be used for setting a tool in a direction other than the height direction. It is envisaged that the embodiments may be used for datuming tools such as probes for inspecting a workpiece, as well as cutting tools.

One aspect of the present invention provides a stylus tip for a tool setting probe for a machine tool, having means for attachment of the tip to the tool setting probe, and at least one first datum surface, characterised in that a second datum surface is provided on the tip, said second surface extending at a non-90° angle to said first surface. Preferably said first surface is one hich is arranged to be vertical in use. Preferably said second surface is also at a non-90° angle to a horizontal plane. The second surface may comprise a stepped configuration extending at said angle, the stepped configuration comprising a plurality of sub-surfaces each of which extend in a respective different plane parallel to the first surface.

A second aspect of the invention provides a tool setting probe having a stylus with a tip as set forth above, and means for detecting contact or proximity of the stylus tip with a cutting tool.

A third aspect of the invention provides a method of checking the setting of a tool using such a proble, comprising the steps of:
  (a) moving the tool along a first axis normal to the first surface into contact or proximity with each of the first and second surfaces, the contact or proximity being detected by said detecting means,
  (b) taking readings of the tool position along the first axis when it comes into said contact or proximity with each of the first and second surfaces,
  (c) determining the difference between said readings, and
  (d) determining from said difference the position of the tool along a second axis normal to the first axis.

The terms "vertical" and "horizontal" as used herein are relative terms, and should be understood accordingly. They relate to the orientation of, for example, a stylus tip or probe when in use on a machine tool. The bed of some machine tools, particularly lathes, may be inclined at an angle to the absolute horizontal plane (e.g. as shown in the above-mentioned U.S. Pat. No. 4,382,215) and in this case the term "horizontal" relates to planes parallel to the machine bed, not to the absolute horizontal plane, and the term "vertical" and references to the height of a tool are to be interpreted accordingly.

BRIEF DESCRIPTION OF THE DRAWINGS

Preferred embodiments of the invention will now be described by way of example, with reference to the accompanying drawings, wherein:

FIG. 1 is a vertical section of a tool setting probe on a lathe bed, with part of a cutting tool and other lathe components, FIG. 2 is a section on the line II—II in FIG. 1, FIG. 3 is an isometric view of a stylus tip shown in FIG. 1, FIGS. 4 and 5 are front and side views of a second stylus tip, FIGS. 6 and 7 are front and side views of a third stylus tip, FIG. 8 is a front view of a fourth stylus tip, with part of a cutting tool, FIG. 9 is an isometric view of a fifth stylus tip, FIG. 11 is a diagrammatic illustration of tool positioning for machining a workpiece.

DESCRIPTION OF THE PREFERRED EMBODIMENTS

Figure 10:
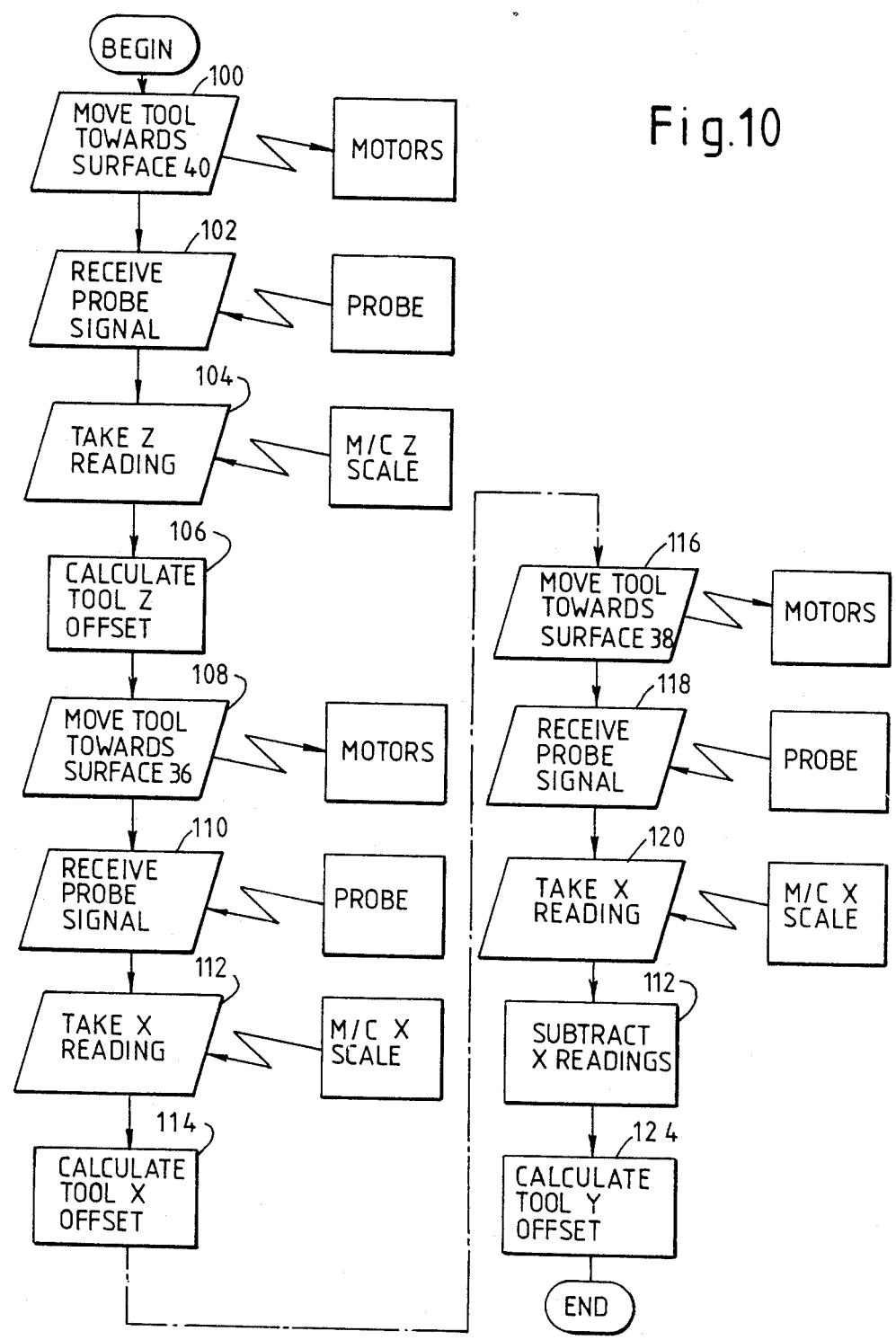
FIG. 10 is a flowchart of a program for use with the probe.

Referring firstly to FIG. 1, a lathe is provided with a cutting tool 32 having a cutting tip 30. It also has motors and scales or resolvers 64 for tool movement along both X and Z axes of the lathe, whereby the tool can be moved to a desired position as indicated by the scales or resolvers, under the control of a computer 60. However, the position of the tool tip 30 relative the scales needs to be set or datumed prior to use. As seen in FIGS. 1 and 2, a tool setting probe 10 is mounted on the bed 12 of the lathe for this purpose. As an alternative, it may be mounted on a pivotable arm which can be swung into a fixed location relative to the lathe bed, and swung out of the way when not required. The probe 10 comprises a housing 14 within which is located a movable stylus-holding member 16. A stylus tip 18 is provided on a vertically upwardly projecting stylus 20, which is attached by a screw connection at 22 to the stylus holder 16. The stylus holder 16 has three radially projecting cylinders 24, spaced around the vertical axis of the probe, each seated between converging surfaces defined by a pair of balls 26 on the housing 14. A spring 28 urges the stylus holder into a rest position which is kinematically defined by the seating of the cylinders 24 in the pairs of balls 26, and which is therefore accurately repeatable.

The stylus holder and stylus can be displaced from the rest position against the action of the spring when the tip 30 of the cutting tool 32 contacts the stylus tip 18. This is detected by a series electrical connection 34 through the balls and cylinders, which is broken when any one of the cylinders ceases to contact either of its pair of balls. This triggers the controlling computer 60 of the lathe through a probe interface 62 to take a reading of the position of the tool from the scales or resolvers. From this, the computer calculates a tool offset value for use during subsequent machining operations. The series electrical connection 34 can be replaced by any other known means for detecting contact or proximity of the stylus tip with the cutting tool, such as piezo-electric, capacitive, electromagnetic or optical detectors, or electrical contact detection between the cutting tool and the stylus tip.

As seen in FIGS. 1 and 3, the stylus tip 18 is generally cube-shaped, with a vertical datum surface 36. The tip 30 of the tool 32 can touch the datum surface 36 by movement in the direction of the arrow A, which will be assumed to be along the X axis of the lathe in the following description, although it could equally be along the Z axis. The surface 36 is accurately ground and set up to be normal to the lathe's X axis when the stylus is in the rest position. A further vertical datum surface 40, at right angles to the surface 36, is accurately ground and set up normal to the Z axis.

Laterally adjacent the surface 36 the stylus tip has a downwardly sloping datum surface 38. The surface 38 is at an angle of 45° both to the surface 36 and to the horizontal.

The tool 32 can be set or datumed in the manner shown in FIG. 10, which is a flowchart representing a program executed by the computer controlling the lathe. It is assumed that the probe 10 has previously been calibrated, so that the positions of its surfaces 36, 38, 40 are known. In the case of the sloping surface 38, the position calibrated is the intersection between the surface 38 and the horizontal plane containing the centre line of the lathe (i.e. the axis of rotation of the chuck).

The tool tip 30 is first moved along the Z axis towards the surface 40 of the stylus tip 18 (step 100), until the probe trigger signal is received at 102, indicating that the tool tip 30 has contacted the surface 40. The computer then takes a reading from the scale or resolver on the lathe, indicating the Z axis position of the tool holder holding the tool 32 (step 104). The difference between this reading and the calibrated position of the surface 40 gives the tool offset value in the Z direction, which is calculated in step 106 and stored for future use when positioning the tool for machining a workpiece.

Next, the same process is repeated in steps 108 to 114 to obtain a tool offset value in the X direction, moving the tool tip in the X direction to contact the surface 36 of the stylus tip, and taking a reading from an X axis scale or resolver of the lathe. The tool X offset value is again stored for future use.

Now, the tool is moved along the X axis towards the sloping surface 38 (step 116) until the probe trigger signal indicates contact with that surface (step 118). Another X reading from the lathe's X axis scale or resolver is taken, in step 120. In step 122, the computer determines the difference between the X readings obtained in steps 112 and 120. Because of the slope of the surface 38, this difference is a measure of the height of the tool tip in the Y direction. This is used in step 124 to calculate a Y offset value. Since the slope of the surface 38 is 45°, the Y offset value is simply the difference between the result of step 122 and the calibrated X axis position at which the surface 38 intersects the horizontal plane of the lathe centre line (subject to the addition of a constant relating the calibrated X axis position of the surface 38 to that of the surface 36).

The Y offset value thus obtained may be used simply to indicate to the machine operator that the tool is at the wrong height, and must be changed, should the value be outside a predetermined tolerance band. This will most often be the use made of the Y offset value in the case of a tool to be used for facing or parting off. Alternatively, the Y offset may be used to calculate a correction for the X positioning of the tool tip when machining is required to a precise radius r. This is illustrated in FIG. 11. If the tip 30 of the tool 32 has a Y offset h from the horizontal plane 50 through the lathe's centre axis 52, then the precise radius r can be obtained by positioning the tool tip as if to machine at a radius x, where x is given by Pythagoras' theorem:

$$x = \sqrt{r^2 - h^2}$$

The computer 60 makes the above calculation and derives an X offset for positioning the tool tip, which it then uses for the machining.

FIGS. 4 and 5 show an alternative stylus tip 418, with X and Z datum surfaces 436, 440, which can be used in the same manner as the tip 18. The difference is that the tip 418 has a sloping datum surface 438 at a much shallower angle to the horizontal than the surface 38. This gives increased resolution for measurement of the Y offset. The calculation of the Y offset now obviously involves a trigonometrical calculation, using the tangent of the angle of the sloping surface 438.

However, such a shallow slope may not always be ideal, because the tool tip 30 may in some circumstances slide slightly along such a shallow slope before the probe triggers, and this unreliable triggering would lead to lack of repeatability. Indeed, for this reason, a slope angle which is much nearer the vertical may sometimes be desired, e.g. 30° to the vertical.

Those familiar with tool setting probes will realise that the balls and cylinders arrangement shown in FIG. 1 is the inverse of the usual arrangement. That is, a more common arrangement would have the cylinders 24 spring biased upwardly into downwardly facing seats formed by the pairs of balls 26. Such an arrangement could be used, but the FIG. 1 arrangement is preferred because the more common arrangement would not permit upward movement of the stylus tip 18 when the tool tip 32 contacts the sloping surface 38, and could lead to jamming of the tool tip under the surface 38. This jamming problem would be more acute with a shallow slope as shown in FIGS. 4 and 5.

Both the FIG. 1 arrangement of the balls and cylinders, and the more common arrangement just referred to, are what are commonly called five-way arrangements. That is, the stylus tip can be displaced in all four horizontal directions, but only one vertical direction (upwards or downwards, but not both). Six-way arrangements could be used instead, to allow the stylus tip to move both upwards and downwards. A suitable six-way arrangement is seen in U.S. Pat. No. 4,288,925 (in the context of a probe for sensing contact with a workpiece, rather than for tool setting). FIGS. 6 and 7 illustrate a stylus tip 618 which eliminates the problems of jamming and of the tool tip sliding under a shallow sloping surface, though at the expense of resolution in the Y direction. The tip 618 is similar to the tip 18, with X and Z datum surfaces 636,640, except that its sloping surface 638 has a stepped configuration, being made up of alternate horizontal and vertical sub-surfaces 650,652. Each of the vertical sub-surfaces 652 is parallel to and at a known distance horizontally from the surface 636. The calculation of the Y offset in step 124 of FIG. 10 is now simply a question of deciding which of the vertical sub-surfaces 652 has been contacted, and looking up its height in the Y direction in a pre-stored table. The step height of the sub-surfaces of the surface 638 may for example be half a millimeter. Whilst this obviously limits the resolution accordingly, in some sytems this may not matter (e.g. if the positioning of the tool in a tool block can only be performed to a tolerance of plus or minus a quarter of a millimeter).

In some lathes, the cutting tip of the tool may not be on the upper edge of the tool (as seen in FIG. 1) but on the lower edge. An example is shown in FIG. 8, in which the tool is denoted 832 and the tool tip 830. FIG. 8 also shows a stylus tip 818 intended for this situation. It has X and Z datum surfaces 836,840 which correspond to the surfaces 36,40 in FIGS. 1 and 3. However, in place of the downwardly facing sloping surface 38, there is an upwardly facing sloping surface 838. The method of use of this stylus tip corresponds with that of the tip 18. It will be appreciated that in a similar manner there could be provided upwardly facing shallow or stepped sloping surfaces, corresponding to the surfaces 438 and 638 in FIGS. 4 to 7. With such upwardly facing sloping surfaces, it is preferable to use a balls and cylinders arrangement in which the cylinders 24 are biased upwardly into downwardly facing ball seats, rather than the inverse arrangement of FIG. 1.

Modern lathes are frequently fitted with a variety of different cutting tools, with tips oriented in different directions for different types of work (e.g. turning inside and outside diameters, work on forward and rearward faces, etc). The surface 38 in FIGS. 1 and 3 may not be accessible to all these different types of tool. For this reason, the surface 38 may be arranged such that it is inset at a non-90° angle to the datum surface 40 instead of the surface 36; or it may be inset into another face of the cube if this is more accessible for a particular purpose. Two or more surfaces 38 may be inset into different faces of the cube to increase versatility, as illustrated in FIG. 9.

The various stylus tips described above may be made from metal, or from a ceramic material for lightness. In the latter case, at least, it may only be necessary for the vertical datum surfaces to be accurately ground, since depending on the accuracy required in the Y direction, the fabrication accuracy of the sloping surface or surfaces of the tip may be adequate without further grinding.

Although described above in relation to use on a two axis lathe, the invention can also be used on three axis lathes and on other machine tools such as machining centres. For example, the capability of a three axis lathe to move in the Y direction may be used to correct for the Y offset, once this has been measured by the use of the invention. On a three axis machine tool, the sloping surface 38 need not be at a sloping angle to the horizontal; it could instead be vertical, and at a non-90° angle to both the machine's horizontal axes. Such a stylus tip may have advantages in datuming specially shaped tools.

I claim:
1. A stylus tip for a tool-setting probe for a machine tool, configured relative to a set of first, second and third orthogonal axes and having:
   means for attachment of the tip to the tool-setting probe;
   a first datum surface located on the tip normal to said first axis and accessible by movement of a tool along a first line parallel to said first axis; and
   a second datum surface located on the tip lateral of said first datum surface in a direction of said second axis, and accessible by movement of said tool along a second line parallel to said first axis, said first and second lines being spaced apart in said direction of said second axis;
   wherein said second datum surface extends at a non-90° angle with respect to said first datum surface and said third orthogonal axis.

2. A stylus tip according to claim 1, wherein said first datum surface is disposed, relative to the attachment means, so as to be vertical in use.

3. A stylus tip according to claim 1, wherein said second datum surface is disposed, relative to the attachment means, so as to be at a non-90° angle to a horizontal plane in use.

4. A stylus tip according to claim 1, wherein said second datum surface comprises a stepped configuration extending at said angle, the stepped configuration comprising a plurality of sub-surfaces each of which extends in a respective different plane parallel to the first datum surface.

5. A stylus tip according to claim 1, having two said first datum surfaces, and two said second datum surfaces each extending at a non-90° angle to the respective one of said first datum surfaces, and said third orthogonal axis.

6. A stylus tip according to claim 5, wherein said first datum surfaces are disposed at right angles with respect to each other.

7. A tool-setting probe for a machine tool, having a stylus with a stylus tip configured relative to a set of first, second and third orthogonal aaxes, and means for detecting contact or proximity of the stylus tip with a cutting tool, the stylus tip having at least one first datum surface normal to said first axis and accessible by movement of a tool along a first line parallel to said first axis, and a second datum surface provided on the tip lateral of said first datum surface in a direction of said second axis, and accessible by movement of said tool along a second line parallel to said first axis, said first and second lines being spaced apart in said direction of said second axis, said second datum surface extending at a non-90° angle to said first datum surface and said third orthogonal axis.

8. A tool-setting probe according to claim 7, wherein said first datum surface is disposed so as to be vertical in use.

9. A tool-setting probe according to claim 7, wherein said second datum surface is disposed so as to be at a non-90° angle to a horizontal plane in use.

10. A tool-setting probe according to claim 7, wherein said second datum surface comprises a stepped configuration extending at said non-90° angle, the stepped configuration comprising a plurality of sub-surfaces each of which extends in a respective different plane parallel to the first datum surface.

11. A tool-setting probe according to claim 7, having two said first datum surfaces, and two said second datum surfaces each extending at a non-90° angle to the respective one of said first datum surfaces, and said third orthogonal axis.

12. A tool-setting probe according to claim 11, wherein said first datum surfaces are disposed at right angles to each other.

13. A tool-setting probe according to claim 7, comprising a movable member to which the stylus is attached, and a fixed member, said members having co-operating elements which kinematically define a rest position for the movable member on the fixed member, means being provided for urging the movable member into the rest position, the movable member being displaceable from the rest position upon contact of the stylus tip with a cutting tool.

14. A tool-setting probe according to claim 13, wherein said second datum surface has a downwardly facing slope, and the urging means urges the movable member downwards into an upwardly facing seat on the fixed member, so that the movable member is displaceable upwardly upon contact of the stylus tip with the cutting tool.

15. A tool-setting probe according to claim 13, wherein the detecting means comprises an electrical circuit through said co-operating elements.

16. A method of checking the setting of a tool, using a tool-setting probe having a stylus with a stylus tip, and means for detecting contact or proximity of the stylus tip with the tool, the stylus tip having at least one first datum surface, wherein a second datum surface is provided on the tip, said second surface extending at a non-90° angle to said first surface, the method comprising the steps of:

(a) moving the tool in a direction of a first axis normal to the first datum surface into contact or proximity with the first datum surface, the contact or proximity being detected by said detecting means, (b) moving the tool in a direction of a second axis parallel to said first datum surface and further in a direction of said first axis into contact or proximity with the second datum surface, the contact or proximity being detected by said detecting means, (c) taking readings of the tool position along the first axis when it comes into said contact or proximity with each of the first and second datum surfaces, (d) determining the difference between said readings, and (e) determining from said difference the position of the tool along a third axis normal to the first and second axes.

* * * * *